United States Patent
Mohamed et al.

(10) Patent No.: US 9,527,364 B2
(45) Date of Patent: Dec. 27, 2016

(54) SYSTEM AND METHOD FOR ESTIMATING DAMPER TEMPERATURE

(71) Applicant: FORD GLOBAL TECHNOLOGIES, LLC, Dearborn, MI (US)

(72) Inventors: Ahmed Mohamed, Dearborn, MI (US); Russ Lee Norton, Brownstown Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/563,604

(22) Filed: Dec. 8, 2014

(65) Prior Publication Data

US 2016/0159188 A1  Jun. 9, 2016

(51) Int. Cl.
*B60G 17/019* (2006.01)
*F16F 9/32* (2006.01)
*F16F 15/00* (2006.01)

(52) U.S. Cl.
CPC ....... *B60G 17/019* (2013.01); *B60G 17/01933* (2013.01); *F16F 9/3292* (2013.01); *F16F 15/002* (2013.01)

(58) Field of Classification Search
CPC ..... B60G 15/04; B60G 15/00; B60G 2500/10; B60G 17/08; B60G 17/06
See application file for complete search history.

(56) References Cited

U.S. PATENT DOCUMENTS

| | | | |
|---|---|---|---|
| 2,904,330 A | 9/1959 | Jackson et al. | |
| 5,200,895 A | 4/1993 | Emura et al. | |
| 5,579,229 A | 11/1996 | Maguran, Jr. | |
| 5,788,028 A | 8/1998 | Bieber | |
| 2003/0195683 A1* | 10/2003 | Oakley | B60G 17/0152 701/37 |
| 2015/0057885 A1* | 2/2015 | Brady | B60G 17/06 701/38 |

FOREIGN PATENT DOCUMENTS

| | | |
|---|---|---|
| DE | 19705562 C2 | 1/2001 |
| EP | 0650859 B1 | 5/1995 |
| EP | 1557304 A1 | 7/2005 |
| GB | 2154700 A | 9/1985 |
| JP | H08-104122 A | 4/1996 |
| JP | 2006-077787 A | 3/2006 |

OTHER PUBLICATIONS

Ismail Sahin, "Trends in the Development of Machinery and Associated Technology", 15th International Research/Expert Conference, Sakaraya University, TMT 2011, Prague, Czech Republic, Sep. 12-18, 2011, http://www.tmt.unze.ba/zbornik/TMT2011/150-TMT11-190.pdf.

* cited by examiner

*Primary Examiner* — Michael D Lang
(74) *Attorney, Agent, or Firm* — Jones Robb, PLLC; Raymond L. Coppiellie

(57) ABSTRACT

Systems and methods for controlling a damper force based on temperature are disclosed. Signals associated with a damping force value of one or more dampers are received at a controller. The signals are received, at the controller, from at least one suspension height sensor, at least one vehicle velocity sensor, at least one ambient temperature sensor, and at least one engine coolant sensor. A damper temperature is estimated, at the controller, and a damping force of the damper is adjusted to a nominal force based on the estimated damper temperature.

18 Claims, 4 Drawing Sheets

SYSTEM AND METHOD FOR ESTIMATING DAMPER TEMPERATURE

TECHNICAL FIELD

The present disclosure relates generally to systems and methods for controlling the damping characteristics of dampers associated with a vehicle's suspension system.

OVERVIEW

Dampers associated with a vehicle's suspension system, or shock absorbers, are used to limit the oscillatory behavior of a vehicle's wheels or body. Dampers can lose their effectiveness, for example, at extreme temperatures due to a change in viscosity of the hydraulic fluid passing through the dampers. Increases and decreases in the viscosity of the hydraulic fluid cause the damping force of the dampers to be increased or reduced. In some instances, changes in the viscosity of the hydraulic fluid passing through dampers may cause the motion of the vehicle to change toward an undamped, or oscillatory motion which results in, for example, increased tire wear, increased suspension wear, and overall degraded vehicle handling.

It is, therefore, advantageous for vehicle control systems, which enhance vehicle handling and passenger safety, to alter the flow of hydraulic fluid inside the dampers, and consequently the damping force of dampers associated with the vehicle's suspension system, at different temperatures to compensate for a consistent force capability associated with the dampers of the vehicle's suspension system over a broadened temperature range. It may be advantageous, therefore, to provide a vehicle damper monitoring system that uses the dynamic motion of the vehicle's wheels and the temperature to monitor and evaluate a desired damping force for the dampers at different temperatures as the vehicle is driven. It may be further advantageous to provide vehicle damper monitoring systems and methods which use existing vehicle sensors to calculate an overall damper temperature, determine a temperature state as a function of the overall temperature, and compensate an applied control current for a desirable damping force.

SUMMARY

In accordance with various exemplary embodiments, systems and methods for estimating a controlled damper temperature are described. In one instance, for example, a vehicle damper monitoring system for controlling damper force based on temperature comprises at least one suspension height sensor, at least one vehicle velocity sensor, at least one ambient temperature sensor, at least one engine coolant sensor, and at least one controller. The controller is configured to receive signals from each of the sensors. The received signals are associated with an actual damping force value of one or more dampers. The controller compares the actual damping force value of the one or more dampers to a predetermined value range and calculates an estimated damper temperature value. When the actual damping force does not fall within the predetermined value range, the controller sends a signal to adjust a damping force of one or more of the dampers associated with the vehicle's suspension system.

In another instance, a system for estimating a controlled damper temperature comprises a vehicle and a controller. The controller is configured to determine an initial damper temperature value of a damper and calculate work exerted by a damper. The controller is further configured to determine an ambient temperature factor and calculate a final damper temperature. Based on the variations between the initial damper temperature value and the final damper temperature value, the controller is configured to compensate a damping force signal.

In another instance, a method for controlling damper force based on temperature comprises receiving, at a controller, signals associated with a damping force value of one or more dampers. The signals are received from at least one suspension height sensor, at least one vehicle velocity sensor, at least one ambient temperature sensor, and at least one engine coolant sensor. The method further comprises estimating a damper temperature and adjusting, based on the estimated damper temperature, a damping force of the damper to a nominal force.

In another instance, a method for estimating a controlled damper temperature comprises determining, at a controller, an initial damper temperature value of a damper and calculating the work exerted by a damper. The method further comprises determining, at the controller, an ambient temperature factor and calculating a final damper temperature. Based on variations between the initial damper temperature value and the final damper temperature value, a damping signal is compensated.

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure, as claimed.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates systems and methods for monitoring and providing consistent damping force for dampers associated with a vehicle's suspension system throughout a broad temperature range to improve the noise, vibration, and harshness characteristics of the vehicle. For example, the embodiments described herein may use the dynamic motion of a vehicle's wheels and temperature sensors to monitor and evaluate a damper temperature state of the dampers associated with the vehicle's suspension system and the resultant damper force at different temperatures as the vehicle is driven. Various embodiments described herein, for example, contemplate a vehicle damper monitoring system comprising at least one suspension height sensor, at least one vehicle velocity sensor, at least one ambient temperature sensor, and at least one engine coolant sensor. In one exemplary embodiment, the system comprises four suspension height sensors. The vehicle damper monitoring system may comprise at least one controller configured to receive signals from each of the sensors and compensate a damping force of one or more of the dampers associated with the vehicle's suspension system based on a determined temperature state of the dampers, and methods which use such systems.

In various exemplary embodiments, the controller may be configured to use the suspension height sensor to calculate and monitor the damping force at each damper associated with the vehicle's suspension system using the body characteristics of acceleration, e.g., heave, pitch, and roll, and to calculate the work exerted by each damper associated with the vehicle's suspension system. Embodiments of the present disclosure, however, also contemplate a system that includes additional sensors, for example, the vehicle velocity sensor, the ambient temperature sensor, and the engine coolant sensor as needed to provide the signal inputs in the systems and methods of the present disclosure. Particularly, the additional sensors may be used to determine an initial temperature of the dampers associated with the vehicle's suspension system, an ambient temperature factor and thermal effect surrounding the dampers, the wheel vertical velocity, and overall damper temperature.

Figure 1:
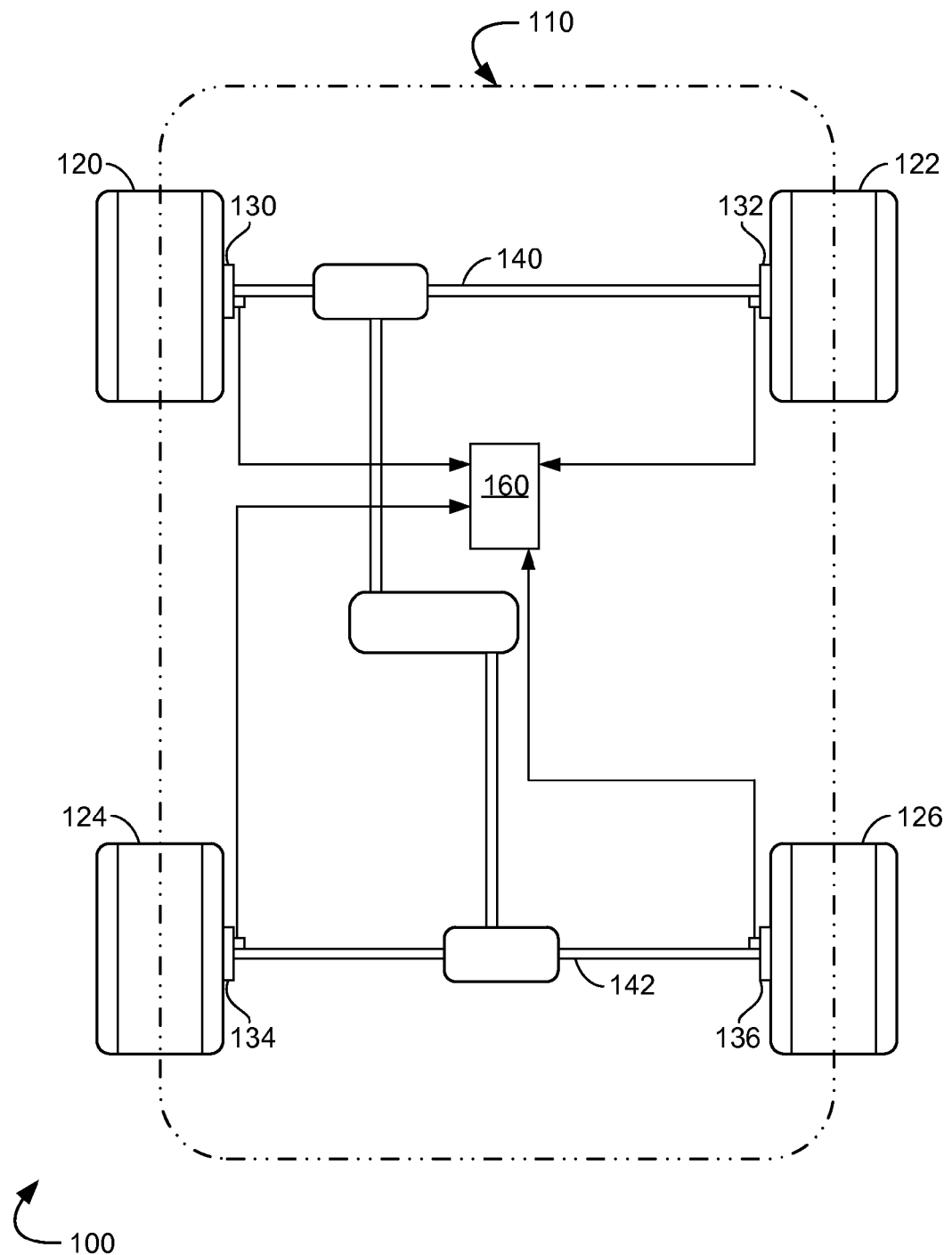
FIG. 1 is a schematic diagram illustrating some structural elements of an exemplary embodiment of a vehicle damper monitoring system for controlling dampers associated with a vehicle's suspension system in accordance with the present disclosure.

FIG. 1 is a schematic diagram illustrating some structural elements of an exemplary embodiment of a vehicle damper monitoring system 100 for controlling the dampers associated with the vehicle's suspension system in accordance with the present disclosure. As illustrated in FIG. 1, a vehicle 110 may have wheel and tire assemblies 120, 122, 124, 126 with respective dampers 130, 132, 134, 136 associated with a vehicle's suspension system. Front wheel 120 and damper 130 are mounted on the left side (LF) of front axle 140 and front wheel 122 and damper 132 are mounted on the right side (RF) of the front axle 140. Rear wheel 124 and damper 134 are mounted on the left side (LR) of rear axle 142 and rear wheel 126 and damper 136 are mounted on the right side (RR) of rear axle 142. Although disclosed herein as primarily a damper associated with each wheel, it is contemplated that alternative damping systems may be used.

The system 100 includes sensors (e.g., suspension height sensors, velocity sensors, ambient temperature sensors, engine coolant sensors, and other known vehicle sensors) to maintain various conditions and systems of the vehicle and at least one controller 160 configured to receive signals transmitted from each of the sensors (not shown). The sensors may be sensors that exist in conventional vehicles or may comprise system specific sensors to maintain and detect various conditions and systems of the vehicle. For example, in various exemplary embodiments, as illustrated in FIG. 1, the sensors (not shown) may be associated with the wheel and tire assemblies 120, 122, 124, 126, the dampers 130, 132, 134, 136, the vehicle body (not shown), and/or a vehicle engine (not shown), etc. As will be understood by those of ordinary skill in the art, each sensor (not shown) may be mounted with respect to a respective wheel and tire assembly 120, 122, 124, 126 and be used to continuously measure the relative states of the wheel and tire assemblies 120, 122, 124, 126, dampers 130, 132, 134, 136, and engine of the vehicle as it is driven. In this manner, the sensors (not shown) may be used to measure the relative motion of the wheel and tire assemblies 120, 122, 124, 126 (e.g., body characteristics of acceleration—heave, pitch, and roll, ambient temperature, engine coolant temperature, etc.) with respect to the vehicle body (not shown). The sensors (not shown) may be used to calculate and monitor the damping force at each damper 130, 132, 134, 136 associated with the vehicle's suspension system. The controller 160 uses the received signals to monitor and calculate the damper temperature of each of the dampers 130, 132, 134, 136 associated with the vehicle's suspension system. Monitoring at each damper 130, 132, 134, 136 may be done continuously, cyclically, and/or periodically.

The controller 160 may compensate an applied control current to achieve a desired damping force for one or more of the dampers 130, 132, 134, 136 associated with the vehicle's suspension system by varying an orifice in the damper 130, 132, 134, 136 at different temperatures to allow for more or less damping.

Those of ordinary skill in the art will understand that the vehicle damping monitoring system 100 illustrated in FIG. 1 is exemplary only and intended to illustrate on embodiment of the present disclosure. Accordingly, vehicle damper monitoring systems in accordance with the present disclosure may have various types, numbers and/or configurations of wheels, dampers, controllers, and/or sensors without departing from the scope of the present disclosure and claims. For example, although the system 100 illustrated and described with reference to FIG. 1 includes four sensors (suspension height sensor, vehicle velocity sensor, ambient temperature sensor, engine coolant sensor, etc.), various additional embodiments of the present disclosure contemplate, for example, a system that has four suspension height sensors. Various embodiments, for example, contemplate a system with two rear suspension height sensors (i.e., a height sensor on each of the rear wheels 124, 126) or a system with two sensors on the same side of the vehicle 110 (i.e., a height sensor on the right front wheel 122 and a height sensor on the right rear wheel 126). Additionally, one or more vehicle velocity sensors, ambient temperature sensors, and/or engine coolant sensors may be contemplated at various points on the vehicle 110 body (not shown).

Figure 2:
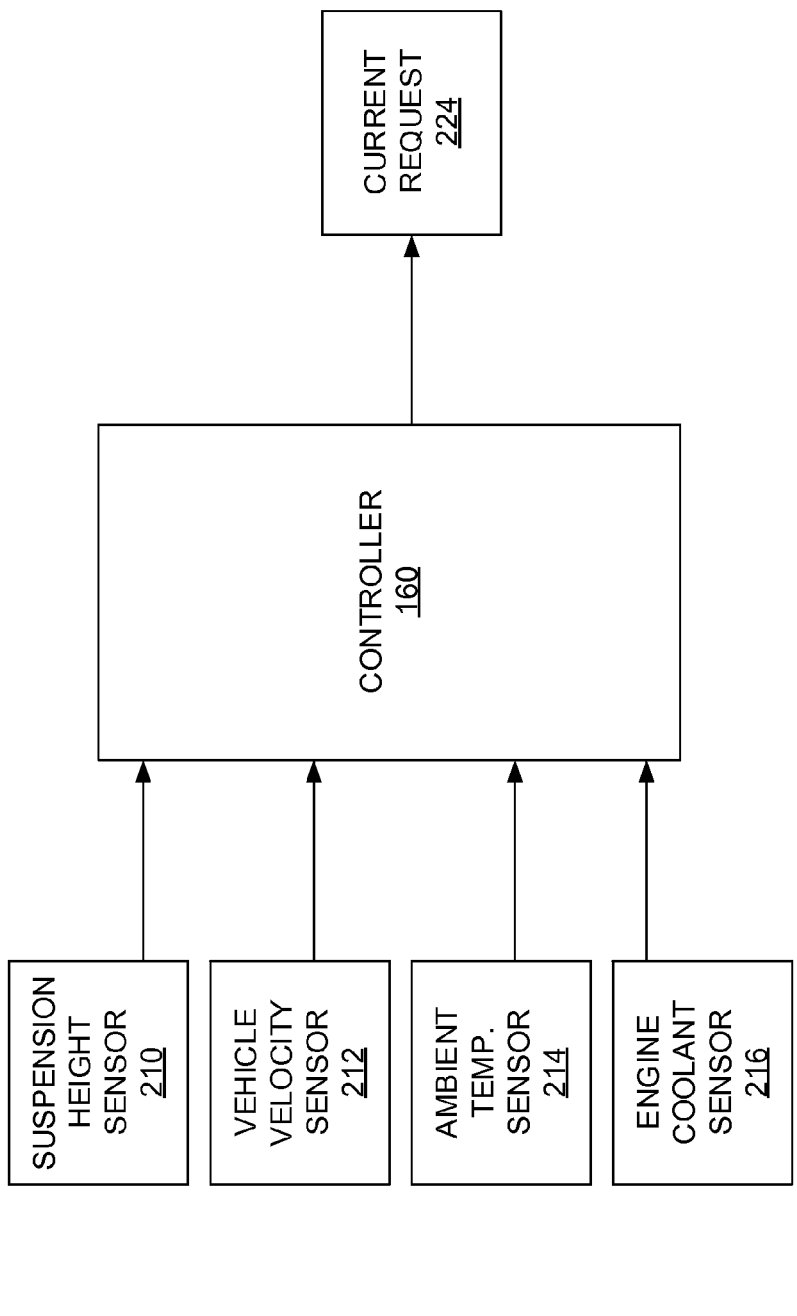
FIG. 2 is a block diagram illustrating the vehicle damper monitoring system of FIG. 1.

FIG. 2 is a block diagram illustrating the vehicle damper monitoring system of FIG. 1. As illustrated in FIG. 2, the controller 160 receives signals from the suspension height sensor 210, vehicle velocity sensor 212, ambient temperature sensor 214, and engine coolant sensor 216. The controller 160 determines a current damper temperature associated with the dampers of the vehicle's suspension system and estimates a force required to control the dampers at an ambient temperature based on the signals received from sensors 210, 212, 214, 216, as set forth in the following exemplary embodiments. The controller 160 may include, for example, an existing vehicle controller such as an Electronic Control Unit (ECU), or a dedicated controller, or control may be distributed among more than one vehicle controller, as will be understood by one ordinarily skilled in the art.

In various exemplary embodiments, the controller 160 receives signal inputs from the suspension height sensor 210, vehicle velocity sensor 212, ambient temperature sensor 214, and engine coolant sensor 216. These signal inputs may be received at the controller 160 over a specified period of time, e.g. a sample rate. Since a fast sampling of the suspension height is necessary, the controller 160 may receive signal inputs from the suspension height sensor 210, e.g., a sample, for example, every 1-2 milliseconds (ms). The controller 160 may receive sample signal inputs correlating to vehicle velocity and engine coolant temperature at the same rate, however sampling these conditions at such a fast rate is not necessary and, instead, the controller 160 may receive the signal inputs correlating to vehicle velocity and engine coolant temperature at a slower sampling rate, for example, every 10-50 ms. The controller 160 may use the signal inputs to calculate and store on an associated memory an estimated damper temperature for each of the dampers associated with the vehicle's suspension system. For example, a processor (not shown) within the controller 160 may operate on data provided by the sensors 210, 212, 214, 216 to determine the current damper temperature state of each of the dampers associated with the vehicle's suspension system and a random access memory (not shown) associated with the controller 160 may store a temperature value that indicates a temperature state of the dampers, e.g., frozen (approximately −40° C. to −10° C.), cold (approximately −9° C. to 10° C.), warm (approximately 11° C. to 60° C.), hot (approximately 61° C. to 90° C.), and overheated (greater than 90° C.), associated with the vehicle's suspension system. Based on the determined temperature state of the dampers, the controller 160 may determine that it is necessary to compensate the damping force, e.g., because a high temperature state causes a damping force lower than desired or a low temperature state cause a damping force higher than desired. To determine whether the damping force, based on the determined temperature state, should be compensated, a damping force of the dampers may be calculated, compared to a threshold value, and mapped to a nominal force curve. Based on the mapping, the controller 160 determines whether compensation is required. The controller 160 may calculate and apply a temperature compensation factor to the temperature state of the dampers associated with the vehicle's suspension system to compensate the damping force of the dampers. In an exemplary embodiment, for example, a predetermined compensation table (discussed in further detail below) maps the determined temperature state of the dampers to the temperature compensation gain. This mapping identifies an appropriate multiplying factor or a temperature compensation gain factor and is applied to the requested damping force.

This may be accomplished, for example, by sending a current request 224 from the controller 160 to a solenoid valve to vary an orifice in each of the dampers associated with the vehicle's suspension system and thus allow for more or less damping. For example, the controller 160 may generate a first signal that corresponds to a desired level of damping. For example, as the controller 160 requests a higher current to be applied by the solenoid valve, the damping force increases. The controller 160 may estimate the temperature of the hydraulic fluid passing through the dampers associated with the vehicle's suspension system and generate a second corresponding signal. The controller 160 may also estimate the damper temperature using the solenoid valve coil resistance. The controller 160 may sense the actual current flowing through the solenoid valve coil and the applied voltage across the coil to estimate the coil resistance. The coil resistance, which is a function of the coil temperature (e.g., coil resistance will increase as the coil temperature increase and the coil resistance will decrease when the coil temperature decrease as well), can be accurately determined by dividing the average applied voltage by the average coil current.

In one exemplary embodiment, the controller 160 automatically applies the desired current level to the dampers associated with the vehicle's suspension system via the current request 224 when the damping force deviates from a desired nominal force curve.

Figure 3:
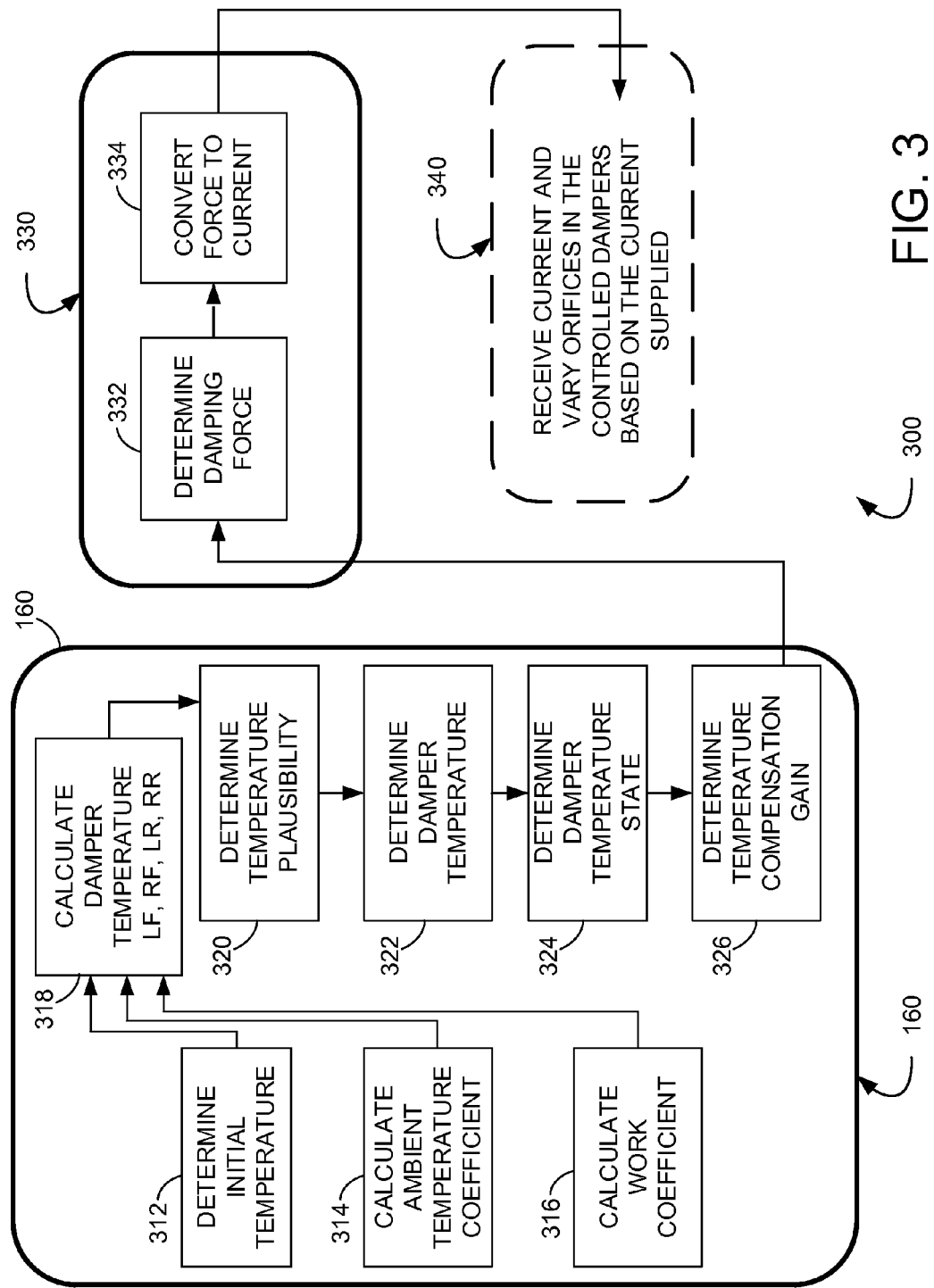
FIG. 3 illustrates a flow diagram depicting an exemplary embodiment of a method 300 of controlling vehicle dampers in accordance with the present disclosure.

FIG. 3 illustrates a flow diagram depicting an exemplary embodiment of a method 300 of controlling vehicle dampers in accordance with the present disclosure. The exemplary method of controlling vehicle dampers illustrated in FIG. 3 can be implemented in the exemplary vehicle monitoring system 100 illustrated in FIG. 1, in the exemplary vehicle monitoring system 200 illustrated in FIG. 2, or with any suitable vehicle monitoring system. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 3, at step 312, the controller 160 can determine an initial temperature of the dampers associated with the vehicle's suspension system. For example, to determine the initial temperature of the dampers associated with the vehicle's suspension, the controller 160 accounts for a time period between key ignition cycles that the vehicle was in an off position, the last recorded temperature value of the dampers, and the ambient temperature value of the dampers associated with the vehicle's suspension system (obtained from the ambient temperature sensor). For example, at the end of each key ignition cycle of a vehicle (not shown) the last sensed temperature value of the dampers associated with the vehicle's suspension system may be recorded and stored in a non-volatile memory of the controller 160. In a new key ignition cycle, the controller 160 can initiate an initial temperature check of the dampers associated with the vehicle's suspension system when the vehicle starts to determine the initial temperature of the dampers associated with the vehicle's suspension system. The controller 160 compares the last recorded temperature value or an ambient temperature value against a time period that the vehicle engine was in an off position. The controller 160 uses a counter module (not shown) to determine the time period the engine was off and whether the temperature value obtained in the new key ignition cycle is closer to the ambient temperature value (obtained from ambient temperature sensor 214) or the last recorded damper temperature (obtained from the non-volatile memory).

Note: when the time period from the end of a previous key ignition cycle to the new key ignition cycle is significant (e.g., the engine has been off for an extended duration or time period, for example, a "long engine off time"), for example, the engine off time is greater than 10 minutes, the initial temperature value of the dampers will be close to the ambient temperature value. The ambient temperature value is measured by the ambient temperature sensor 214. The ambient temperature sensor 214 continuously senses the ambient temperature. When the time period from the end of a previous key ignition cycle to the new key ignition cycle is minimal (e.g., the engine has not been off for an extended duration or time period, for example, a "short engine off time"), for example, the engine off time is less than 10 minutes, the initial temperature value of the dampers will be closer to the last known or recorded damper temperature value.

At step 314 the controller 160 calculates an ambient temperature coefficient. For example, in one exemplary embodiment, the ambient temperature coefficient is calculated by the controller 160 as a function of the ambient temperature (obtained from ambient temperature sensor 214), vehicle velocity (obtained from vehicle velocity sensor 212), and engine coolant temperature (obtained from engine coolant sensor 216). The ambient temperature coefficient is used to determine the thermal effect surrounding the dampers associated with the vehicle's suspension system and acts as a cooling factor for the damper. For example, at a low vehicle speed, the engine heat (after running for a significant period of time) increases the ambient temperature coefficient since the engine temperature is increased (e.g., high temperature state). The ambient temperature of the dampers associated with the vehicle's suspension system combined with the engine heat value obtained from the engine coolant sensor is used to determine the ambient temperature coefficient.

In one exemplary embodiment, the vehicle engine heat and engine coolant temperature contribute to the ambient temperature coefficient only when the vehicle engine has been running at low vehicle velocities for an extended period of time. At higher vehicle velocities, the effect of the engine coolant temperature is reduced to zero and the ambient temperature will be the only factor used to calculate the ambient temperature coefficient.

At step 316, the controller 160 calculates a work coefficient. In an exemplary embodiment, the work coefficient is continuously calculated by the controller 160 as a product of the wheel vertical velocity (obtained from suspension height sensor 210) and the calculated damping force of the dampers associated with the vehicle's suspension. For example, the wheel vertical velocity can be obtained by differentiating the suspension height of the dampers associated with the vehicle's suspension system from the wheel base of a vehicle tire. The wheel vertical velocity can be determined from the suspension height (obtained from suspension height sensor 210) and is used to determine the overall work done by the dampers and to estimate a damping force value that can be converted to current. The damping force obtained may be calculated using the body characteristics of acceleration, e.g., heave, pitch, and roll, obtained from the inertial measurement unit sensor (IMU) (not shown), and is proportional to the amount of current requested. The work coefficient may be integrated over a period of time. Although disclosed herein as continuously calculated, one of ordinary skill will recognize that work may be periodically or cyclically calculated as well.

Note: the suspension height sensor output is in voltages and may be mapped to displacement values. Filtering and derivation of the displacement values may output the wheel vertical velocity.

One skilled in the art, using the disclosure provided herein, will appreciate that the determined initial temperature value 312, the calculated ambient temperature coefficient 314, and the calculated work coefficient 316 may be obtained, determined, and calculated in various ways.

At step 318, the controller 160 calculates the damper temperature of the dampers associated with the vehicle's suspension system. For example, in an exemplary embodiment, the controller 160 uses an algorithm to calculate the damper temperature for the left front (LF) damper, right front (RF) damper, left rear (LR) damper, and the right rear (RR) damper associated with the vehicle's suspension system. Each damper temperature is calculated by starting with the initial damper temperature value obtained at step 312. The algorithm uses the thermal capacity of the dampers associated with the vehicle's suspension system, e.g., the amount of work that the dampers associated with the vehicle's suspension system (LF, RF, LR, RR) need to perform to increase the initial damper temperature value by approximately 1° Celsius. The thermal capacity of the dampers associated with the vehicle's suspension system is a constant that may be experimentally obtained. Once the thermal capacity of the dampers associated with the vehicle's suspension system has been determined, the algorithm may calculate the damper temperature using the work coefficient determined in step 316, the calculated ambient temperature coefficient, e.g., the thermal dissipation rate of the dampers associated with the vehicle's suspension system, determined in step 314, and the thermal capacity.

One of skill in the art would understand that the algorithm can predict the damper temperature without determining the initial temperature at step 312, but only after the vehicle has been running for an extended duration. For example, if the initial temperature is falsely determined, the calculated damper temperature at step 318 will approach the correct value, but only after an extended time period, for example, twenty-five minutes. Step 312 ensures that the calculated damper temperature is correct when the vehicle has been running for a short duration, for example, less than twenty-five minutes. In an exemplary embodiment, therefore, the initial temperature at step 312 is determined each time the vehicle is started to ensure the correct damper temperature is calculated.

In an exemplary embodiment, the damper temperature is calculated by: determining a difference between the work coefficient determined in step 316 and the dissipation rate of convection, e.g., the ambient temperature coefficient, determined in step 314; and, dividing the output (difference) by the thermal capacity of the dampers associated with the vehicle's suspension system to obtain the heating rate of the dampers associated with the vehicle's suspension system. The damper temperature is the integration of the heating rate starting at the initial damper temperature determined in step 312. One skilled in the art, using the disclosure provided herein, will appreciate that the damper temperature can be calculated and determined in various ways by employing the laws of thermodynamics. In one exemplary embodiment, the heating rate (e.g., the heat generated rate—the cooling rate) and the heat generated rate is related to the work applied by the damper.

At step 320, the controller 160 determines a temperature plausibility of the damper temperature calculated in step 318. For example, in an exemplary embodiment, the controller 160 uses an algorithm to continuously run checks on each calculated damper temperature value. In some instances, when the estimated coil temperature is not equal to the calculated damper temperature or within a preset threshold, for example less than 5° C. of the calculated damper temperature, the calculated damper temperature may be flagged as suspicious.

In another exemplary embodiment, the controller 160 may run timer while the algorithm continuously checks whether or not the calculated damper temperature value is suspicious. If the calculated damper temperature value is suspicious for an extended period of time, then the calculated damper temperature is flagged as non-plausible and the ambient temperature value is used as the damper temperature value.

At step 322, the controller 160 determines an overall damper temperature value for the dampers associated with the vehicle's suspension system for vehicle ride consistency. In an exemplary embodiment, the controller 160 uses an algorithm to estimate the overall damper temperature of the dampers associated with the vehicle's suspension system. This is accomplished by averaging the calculated damper temperature of at least two plausible dampers associated with the vehicle's suspension system. For example, the estimated overall damper temperature may be the average of the calculated damper temperature of the left rear (LR) and right rear (RR) dampers only if both of the calculated damper temperatures of the LR and RR dampers were determined plausible in step 320. One of skill in the art will understand that the estimated overall damper temperature may be the average of the calculated damper temperature of at least two dampers associated with the vehicle's suspension system chosen from the left rear (LR), right rear (RR), left front (LF), and right front (RF) dampers so long as both of the chosen dampers associated with the vehicle's suspension system were determined plausible in step 320.

Note: If only one of the calculated damper temperatures of the LF, RF, LR, RR dampers associated with the vehicle's suspension system was determined plausible in step 320, e.g., degraded state, then the overall estimated damper temperature will be the ambient temperature value (obtained from the ambient temperature sensor 214) or the last known temperature used for determining the initial temperature of the dampers associated with the vehicle's suspension system in step 312. The degraded state occurs when only one valid temperature is plausible in step 320. The degraded state prevents transition between temperature states at step 324. In the degraded state, the overall estimated temperature will be the ambient temperature value.

At step 324, the controller 160 determines a temperature state of the dampers associated with the vehicle's suspension system. In an exemplary embodiment, the damper temperature state is a function of the overall damper temperature determined in step 322. For example, the algorithm via the controller 160 may compare the value of the overall damper temperature determined in step 322 to predefined temperature states, e.g., frozen (approximately −40° C. to −10° C.), cold (approximately −9° C. to 10° C.), warm (approximately 11° C. to 60° C.), hot (approximately 61° C. to 90° C.), and overheated (greater than 90° C.), that correspond to temperature ranges. In some instances, the damper temperature calculated in step 318 is not plausible (step 320) and the overall damper temperature state is a degraded state (step 322). When this occurs, the estimated overall damper temperature defaults to the ambient temperature (obtained from ambient temperature sensor 214). Once the damper temperature state has been determined, the value of the estimated damper temperature determined in step 322 is compared to a compensation table stored in a memory of the controller 160 by the algorithm and the controller 160 outputs a specific current related to the determined temperature state. In other words, if the estimated overall damper temperature is determined to be in a "hot" state, then the hot temperature state will change a temperature compensation gain to a hot temperature state gain value stored in the compensation table.

For example, in an exemplary embodiment, the input of the compensation table is the determined temperature state of the damper and the output from the compensation table is the temperature compensation gain. The temperature compensation gain is multiplied by the requested damping force. Such as, for example, in a warm state, the temperature compensation gain may be equal to one (e.g., no change to the requested damping force). In frozen or cold temperature states, the compensation gain may be less than one (e.g., to lower the amount of the damping force requested). In hot and overheated states, the compensation gain may be greater than one (e.g., to increase the amount of damping force requested). Thus, in one exemplary embodiment, the frozen temperature compensation gain value is less than a cold temperature compensation gain value and the overheated compensation gain value is greater than a hot compensation gain value. One of skill in the art will understand that the exact temperature compensation gain values may be derived experimentally to align the actual damping forces with the characteristic damping force curves at room temperatures, approximately 25° C.

Note: some conditions may prevent temperature state transition, e.g., transition from a cold temperature state to a warm temperature state, such as, for example, the presence of potholes, non-plausibility, communication error (e.g., sensor connection), or a fail-safe event. In these situations, the temperature state of the dampers will automatically move to a default state, or warm.

At step 326, once the temperature state of the dampers associated with the vehicle's suspension system has been determined (step 324), a temperature compensation gain may change. For example, in the case of a "hot state," the determined compensation gain decreases the damping force and the controller 160 requests a desired current level. In a "cold state," the determined compensation gain increases the damping force and the controller 160 requests a desired current level.

At step 330, the controller 160 accounts for additional ride and handling conditions that may contribute to the damping force of the controlled dampers associated with the vehicle's suspension system. For example, the algorithm via the controller 160 may compensate the requested damping force (steps 318, 320, 322, 324, and 326) for ride and handling conditions that influence the requested damping force such as, for example, rough road, and heave, pitch, and roll accelerations. Once a final damping force 332 has been calculated, considering all ride and handling conditions, the controller 160 converts the desired damping force to a current 334 value. This current 334 value is the amount of current the requested by the controller 160.

At step 340, the solenoid (not shown) receives the requested current, illustrated in FIG. 2, from the controller 160 and the orifices in the controlled dampers are varied based on the current supplied to allow for more or less damping as needed.

Figure 4:
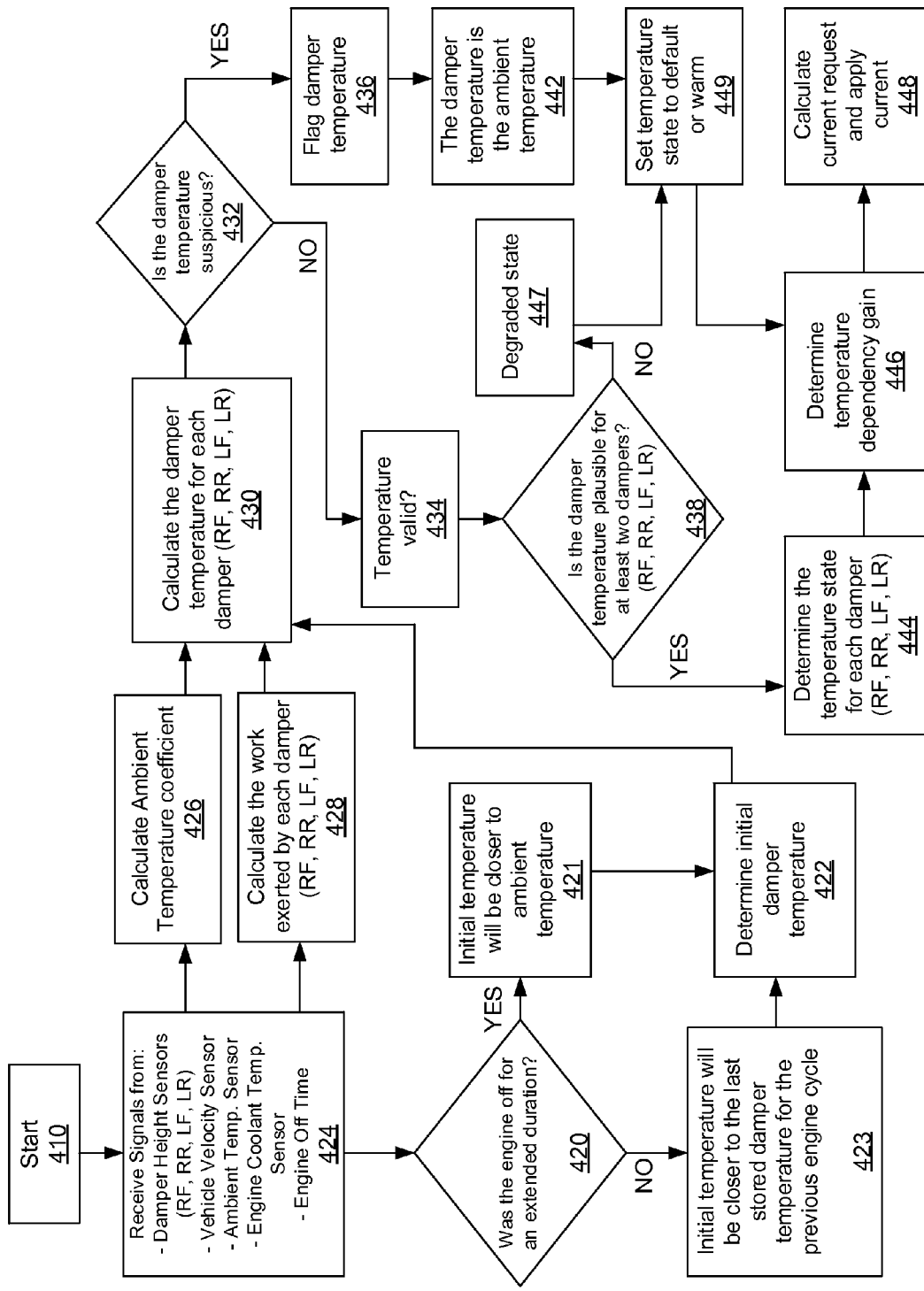
FIG. 4 illustrates a flow diagram depicting another exemplary embodiment of a method 400 of controlling vehicle dampers in accordance with the present disclosure.

FIG. 4 illustrates a flow diagram depicting another exemplary embodiment of a method 400 of controlling vehicle dampers in accordance with the present disclosure. The method will be discussed with reference to the exemplary method of controlling dampers associated with the vehicle's suspension system illustrated in FIG. 3, the exemplary vehicle monitoring system 200 illustrated in FIG. 2, and the structural elements 100 illustrated in FIG. 1. The method may be implemented with any suitable vehicle monitoring system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIGS. 1-4, at step 410, the controller 160 may first confirm that the vehicle 110 is entering a new key ignition cycle, for example, by determining that the vehicle 110 has been started. The controller 160 may receive signals that correspond to suspension height (displacement), vehicle velocity, ambient temperature, and engine coolant temperature (e.g., from suspension height sensor 210, vehicle velocity sensor 212, ambient temperature sensor 214, engine coolant sensor 216) at step 424. In various embodiments, as above, the controller 160 receives signals from the sensors 210, 212, 214, 216 at step 424.

At step 422, when a new key ignition is started, the controller 160 calculates an initial damper temperature value based on the received ambient temperature 214 and engine coolant sensor, as set forth in steps 312-216 above, and depending on the time period the vehicle engine was in the off position determined at step 420, the controller 160 determines at steps 421 and 423 whether the initial damper temperature is closer to the ambient temperature value (obtained from ambient temperature sensor 214) or a recorded temperature value from a previous key ignition cycle stored in the non-volatile memory of the controller 160.

At steps 426 and 428 the controller 160 uses the signals received from the sensors 210, 212, 214, 216 at step 424 to calculate an ambient temperature coefficient at step 426 and the work exerted for the right front (RF), left front (LF), right rear (RR), and left rear (LR) dampers associated with the vehicle's suspension system at step 428. At step 430, the controller 160 uses the received signals from the sensors 210, 212, 214, 216, the ambient temperature coefficient calculated at step 426, and the work exerted by each damper associated with the vehicle's suspension system calculated at step 428 to determine the damper temperature for each of the RF, LF, RR, and LR dampers associated with the vehicle's suspension system. At step 432, an algorithm via the controller 160 that continuously runs plausibility checks on the damper temperature calculated at step 430 to determine whether the estimated damper temperature is suspicious. The estimated damper temperature may be flagged as suspicious at step 436 when the calculated damper temperature is not equal to or within threshold of less than 5° C. of the estimated coil temperature. A counter may be introduced that increments while the algorithm runs checks on the estimated damper temperature. In one exemplary embodiment, if the estimated damper temperature is suspicious for an extended period of time, such as, for example, if the damper temperature is suspicious for longer than fifteen minutes or approximately 1000 seconds, then the damper temperature is flagged at step 436 and the ambient temperature (e.g., sensed by the ambient temperature sensor 214) is used as the estimated damper temperature at step 442, and the counter resets. In another exemplary embodiment, the counter may reset during a controller 160 initialization after turning the ignition on. When the damper temperature is the ambient temperature, the controller 160 may set the temperature state to a default temperature state or a warm temperature state at step 449.

At step 434, the estimated damper temperature of the RF, RR, LF, LR dampers associated with the vehicle's suspension system is not suspicious and the estimated damper temperature is plausible at step 438.

At step 444, based on the estimated damper temperature (not plausible/plausible), the algorithm via the controller 160 determines the temperature state for each damper associated with the vehicle's suspension system. For example, the overall damper temperature is the average of the estimated damper temperature of at least two dampers associated with the vehicle's suspension system determined to be plausible in step 438. Based on the determined damper temperature, the overall damper temperature value is mapped to a predefined temperature states e.g., frozen (approximately −40° C. to −10° C.), cold (approximately −9° C. to 10° C.), warm (approximately 11° C. to 60° C.), hot (approximately 61° C. to 90° C.), and overheated (greater than 90° C.), and the corresponding temperature range. If the damper temperature is not plausible for at least two dampers (LF, RR, LF, LR) at step 438, then the damper temperature is determined to be in a degraded state at step 447 and the temperature state of the damper is set to a default or warm temperature state at step 449. Once the temperature state of the dampers associated with the vehicle's suspension system has been determined at step 444 or set at step 449, a temperature compensation factor at step 446 may be calculated based on the determined temperature state of the dampers associated with the vehicle's suspension system. For example, if the temperature state is determined to be in a "hot state," then the temperature compensation factor will map to hot state values. In the case of a "hot state," the temperature compensation factor will increase the damping force of the dampers associated with the dampers associated with the vehicle's suspension system and the controller 160 may send a current request 224 to a solenoid at step 448. In the case of a "cold state," the temperature compensation factor will decrease the damping force of the dampers associated with the vehicle's suspension system and the controller 160 may send a current request 224 to a solenoid at step 448. Once the current request 224 has been calculated, at step 448, the current request 224 is received at the solenoid from the controller 160 and varies the orifices in the dampers associated with the vehicle's suspension system to allow for more or less damping.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A vehicle damper monitoring system for controlling damper force based on temperature, comprising:
   at least one suspension height sensor, at least one vehicle velocity sensor, at least one ambient temperature sensor, and at least one engine coolant sensor; and
   at least one controller configured to:
      receive signals from each of the sensors, wherein the received signals are associated with an actual damping force value of one or more dampers;
      compare the actual damping force value of the one or more dampers to a predetermined value range: and
      when the actual damping force value does not fall within the predetermined value range:
         calculate an estimated damper temperature value; and
         send a signal to compensate a damping force of one or more of the dampers associated with the vehicle's suspension system, the damping force being compensated by varying orifices of the one or more dampers to allow for more or less damping.

2. The system of claim 1, wherein the controller is further configured to determine an initial damper temperature value and store a most recently calculated damper temperature value in a non-volatile memory.

3. The system of claim 2, wherein the initial damper temperature value is between an ambient temperature value received at the controller from the ambient temperature sensor and a temperature value recorded during a most recent key ignition cycle.

4. The system of claim 1, wherein the controller is further configured to:
   apply a temperature compensation gain factor to the damping force value based on the estimated damper temperature value.

5. The system of claim 1, wherein a wheel vertical velocity is determined from the suspension height sensor.

6. The system of claim 5, wherein a work calculation is applied to the estimated damper temperature value.

7. The system of claim 1, wherein an engine coolant temperature value is received at the controller from the engine coolant sensor.

8. The system of claim 1, wherein a determined work coefficient is applied to the estimated damper temperature value.

9. The system of claim 8, wherein the work coefficient is a function of vehicle velocity and a requested damping force.

10. The system of claim 1, wherein the estimated damper temperature is stored in a non-volatile memory of the controller.

11. A system for estimating a controlled damper temperature, the system comprising;
    a vehicle and a controller, the controller being configured to:
       calculate a current damper temperature value of a damper, the current damper temperature value being based on an initial damper temperature value, a determined ambient temperature factor, and work exerted by the damper;
       calculate a final damper temperature value of the damper based on a plausibility of the current damper temperature value and a determined damper temperature state; and
       compensate a damping force signal based on variations between the initial damper temperature value and the final damper temperature value.

12. The system of claim 11, wherein the initial damper temperature value is based on a recorded temperature value stored in a non-volatile memory.

13. The system of claim 12, wherein the controller is further configured to store a plurality of recorded temperatures over a period of time.

14. The system of claim 11, wherein the work calculation is a product of a damper force and wheel vertical velocity.

15. The system of claim 11, wherein the ambient temperature factor is a function of a measured ambient temperature value, engine coolant temperature value, and a vehicle velocity.

16. The system of claim 11, wherein the determined damper temperature state is one of frozen, cold, warm, hot, and overheated.

17. A method for controlling damper force comprising:
    receiving, at a controller, signals associated with a damping force value of one or more dampers, the signals are received from a suspension height sensor, a vehicle velocity sensor, an ambient temperature sensor, and an engine coolant sensor;
    estimating a damper temperature;
    determining a plausibility of the estimated damper temperature; and
    adjusting, based on the determined plausibility, a damping force of the damper to a nominal force.

18. A method for estimating a controlled damper temperature, the method comprising:
- calculating, at the controller, a current damper temperature value of a damper, the current damper temperature value being based on an initial damper temperature value, a determined ambient temperature factor, and work exerted by the damper;
- calculating, at the controller, a final damper temperature value of the damper based on a plausibility of the current damper temperature value and an associated damper temperature state; and
- compensating a damping signal based on variations between the initial damper temperature value and the final damper temperature value.

* * * * *